US012009145B2

(12) United States Patent
Inaba

(10) Patent No.: US 12,009,145 B2
(45) Date of Patent: Jun. 11, 2024

(54) REACTOR

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuhiro Inaba, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 687 days.

(21) Appl. No.: 17/286,005

(22) PCT Filed: Sep. 27, 2019

(86) PCT No.: PCT/JP2019/038408
§ 371 (c)(1),
(2) Date: Apr. 16, 2021

(87) PCT Pub. No.: WO2020/080075
PCT Pub. Date: Apr. 23, 2020

(65) Prior Publication Data

US 2021/0391115 A1 Dec. 16, 2021

(30) Foreign Application Priority Data

Oct. 18, 2018 (JP) ................................ 2018-197055

(51) Int. Cl.
*H01F 3/14* (2006.01)
*H01F 27/24* (2006.01)
(Continued)

(52) U.S. Cl.
CPC ............ *H01F 27/29* (2013.01); *H01F 27/24* (2013.01); *H01F 41/0246* (2013.01)

(58) Field of Classification Search
CPC ...... H01F 27/29; H01F 27/24; H01F 41/0246; H01F 27/263; H01F 3/14; H01F 27/255;
(Continued)

(56) References Cited

U.S. PATENT DOCUMENTS 10,665,386 B2 5/2020 Hirabayashi et al.
2018/0358172 A1* 12/2018 Yamamoto ............ H01F 27/327
2019/0027294 A1* 1/2019 Yoshikawa ........... H01F 27/306

FOREIGN PATENT DOCUMENTS

JP S61-157312 U 9/1986
JP H4-171704 A 6/1992
(Continued)

OTHER PUBLICATIONS

International Search Report, Application No. PCT/JP2019/038408, mailed Dec. 17, 2019. ISA/Japan Patent Office.

*Primary Examiner* — Tuyen T Nguyen
(74) *Attorney, Agent, or Firm* — Honigman LLP

(57) ABSTRACT

A reactor includes a coil having a wound portion and a magnetic core. The magnetic core includes a first core piece having a molded body of a composite material and a non-magnetic member, the molded body of the composite material contains a magnetic powder and a resin, the non-magnetic member is held by the molded body of the composite material such that the non-magnetic member and the molded body constitute a single piece, the non-magnetic member includes a base portion arranged along an outer peripheral surface of the molded body of the composite material and a protruding piece protruding from the base portion. The protruding piece is inserted into a region of the molded body of the composite material arranged inside of
(Continued)

the wound portion so as to intersect an axial direction of the first core piece.

18 Claims, 3 Drawing Sheets

(51) Int. Cl.
*H01F 27/29* (2006.01)
*H01F 41/02* (2006.01)

(58) Field of Classification Search
CPC ... H01F 27/324; H01F 37/00; H01F 2038/426
USPC .................................................. 336/178, 219
See application file for complete search history.

(56) References Cited

FOREIGN PATENT DOCUMENTS

| | | | |
|---|---|---|---|
| JP | 2010-56237 | A | 3/2010 |
| JP | 2010-238798 | A | 10/2010 |
| JP | 2011-253982 | A | 12/2011 |
| JP | 2013-219112 | A | 10/2013 |
| JP | 2015-46591 | A | 3/2015 |

* cited by examiner

REACTOR

CROSS-REFERENCE TO RELATED APPLICATIONS

This application is the U.S. national stage of PCT/JP2019/038408 filed on Sep. 27, 2019, which claims priority of Japanese Patent Application No. JP 2018-197055 filed on Oct. 18, 2018, the contents of which are incorporated herein.

TECHNICAL FIELD

The present disclosure relates to a reactor.

BACKGROUND

JP 2017-135334A discloses, as a reactor to be used in an in-vehicle converter or the like, a reactor that includes a coil including a pair of wound portions, a magnetic core including a plurality of core pieces that are assembled in a ring shape, and a resin molded portion. The plurality of core pieces include a plurality of inner core pieces that are arranged inside of the wound portions and two outer core pieces that are arranged outside of the wound portions. The resin molded portion covers the outer periphery of the magnetic core. A portion of the resin molded portion that is inside a wound portion is interposed between adjacent inner core pieces and constitutes a resin gap portion.

A reactor in which magnetic saturation is unlikely to occur and that has excellent manufacturability is desired.

If a resin gap portion is provided between core pieces as described above, magnetic saturation is unlikely to occur in the reactor even if a large current value is used. However, in order to form the resin gap portion, it is necessary to combine the core pieces with a member, such as an inner interposed portion 51 in JP 2017-135334A, that keeps a gap between the adjacent core pieces at a predetermined size. Therefore, assembly time becomes long and manufacturability of the reactor is impaired.

In a case where a gap plate such as an alumina plate is provided instead of the resin gap portion described above, the core pieces and the gap plate are bonded with an adhesive as described in paragraph [0019] of the specification of JP 2017-135334A. In this case, time for solidifying the adhesive is necessary, and manufacturability of the reactor is impaired.

Therefore, an object of the present disclosure is to provide a reactor in which magnetic saturation is unlikely to occur and that has excellent manufacturability.

SUMMARY

A reactor according to the present disclosure includes: a coil that includes a wound portion; and a magnetic core that is arranged inside of the wound portion and outside of the wound portion, wherein the magnetic core is formed by combining a plurality of core pieces, at least one core piece of the plurality of core pieces is a first core piece that includes a molded body of a composite material and a non-magnetic member, the molded body of the composite material containing a magnetic powder and a resin, the non-magnetic member is held by the molded body of the composite material such that the non-magnetic member and the molded body constitute a single piece, the non-magnetic member includes a base portion that is arranged along an outer peripheral surface of the molded body of the composite material and a protruding piece that protrudes from the base portion, and the protruding piece is inserted into a region of the molded body of the composite material that is arranged inside of the wound portion, such that the protruding piece intersects an axial direction of the first core piece.

Effect of the Present Disclosure

Magnetic saturation is unlikely to occur in the reactor according to the present disclosure, and the reactor has excellent manufacturability.

DETAILED DESCRIPTION OF PREFERRED EMBODIMENTS

Figure 1:
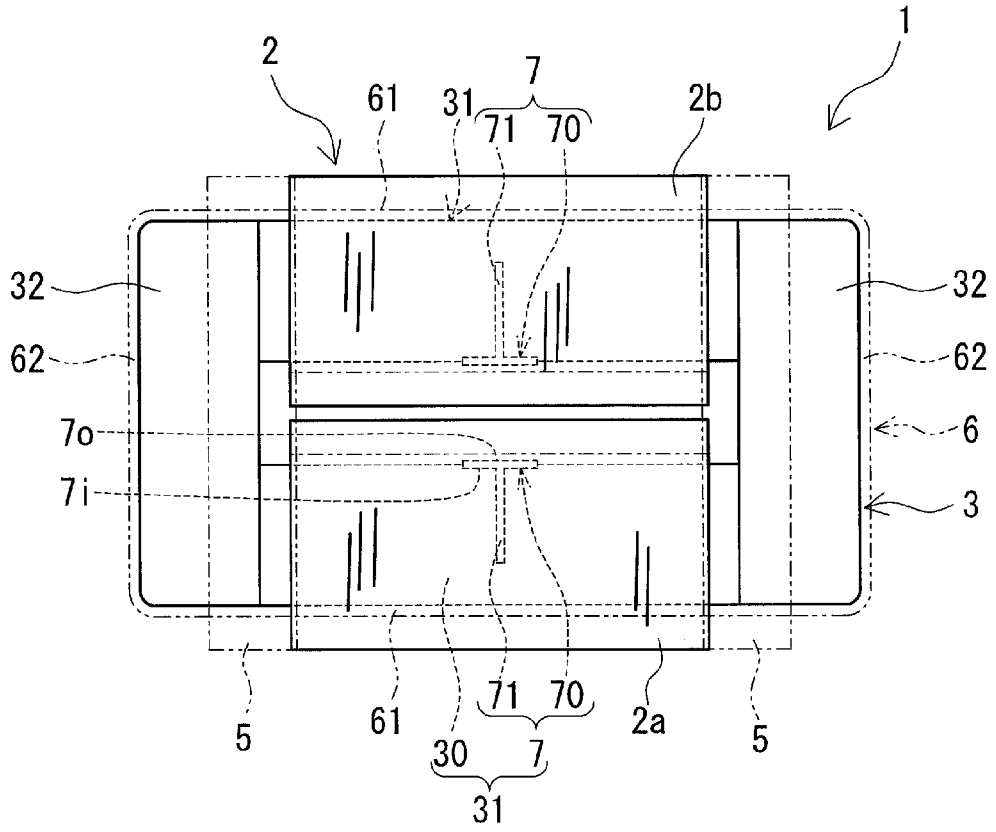
FIG. 1 is a schematic plan view showing a reactor according to a first embodiment.

First, aspects of implementation of the present disclosure will be listed and described.

A reactor according to an aspect of the present disclosure includes: a coil that includes a wound portion; and a magnetic core that is arranged inside of the wound portion and outside of the wound portion, wherein the magnetic core is formed by combining a plurality of core pieces, at least one core piece of the plurality of core pieces is a first core piece that includes a molded body of a composite material and a non-magnetic member, the molded body of the composite material containing a magnetic powder and a resin, the non-magnetic member is held by the molded body of the composite material such that the non-magnetic member and the molded body constitute a single piece, the non-magnetic member includes a base portion that is arranged along an outer peripheral surface of the molded body of the composite material and a protruding piece that protrudes from the base portion, and the protruding piece is inserted into a region of the molded body of the composite material that is arranged inside of the wound portion, such that the protruding piece intersects an axial direction of the first core piece.

Magnetic saturation is unlikely to occur in the reactor according to the present disclosure and the reactor has excellent manufacturability as described below.

Magnetic Characteristics

In the reactor according to the present disclosure, the first core piece is arranged such that the axial direction of the first core piece extends along an axial direction of the wound portion, i.e., a magnetic flux direction of the coil. As a result, the protruding piece of the non-magnetic member in the first core piece is arranged so as to intersect the magnetic flux direction. Such a protruding piece of the non-magnetic member can be used as a magnetic gap. Therefore, magnetic saturation is unlikely to occur in the reactor according to the present disclosure even if a large current value is used. Consequently, the reactor according to the present disclosure can maintain a predetermined inductance even if the large current value is used. Note that the axial direction of the first core piece typically corresponds to a longitudinal direction of the first core piece.

The first core piece is mainly composed of the molded body of the composite material. The molded body of the composite material typically contains a large amount of resin, which is a non-magnetic material, when compared to a layered body of electromagnetic steel plates, a pressed powder molded body, or a pressed powder magnetic core. The molded body of the composite material contains resin in an amount of at least 10 vol %, for example. The resin contained in the composite material also functions as a magnetic gap, and therefore magnetic saturation is unlikely to occur in the reactor according to the present disclosure.

Manufacturability

In the reactor according to the present disclosure, the first core piece includes the non-magnetic member that functions as a magnetic gap. The molded body of the composite material and the non-magnetic member, which constitute the first core piece, are formed as a single piece, and therefore it is possible to omit the above-described member that maintains a gap between adjacent core pieces, the above-described gap plate, and the like. There is no need to combine core pieces with the member that maintains the gap or the gap plate. The time it takes to solidify an adhesive that bonds the core pieces and the gap plate is not needed. For these reasons, assembly time is reduced, and therefore the reactor according to the present disclosure has excellent manufacturability. Furthermore, the first core piece is mainly composed of the molded body of the composite material. Therefore, in a manufacturing step of the first core piece, the molded body of the composite material and the non-magnetic member can be formed into a single piece at the same time when the molded body of the composite material is formed through injection molding or the like. The first core piece can be easily molded and accordingly, the reactor according to the present disclosure has excellent manufacturability.

In addition, the non-magnetic member including the base portion and the protruding piece makes it possible to accurately mold the first core piece in which the protruding piece is arranged at a predetermined position of the molded body of the composite material, when compared to a case where a flat plate material such as a general-purpose gap plate is used, for example. This is because the base portion can be used to position the protruding piece relative to the mold and to hold the protruding piece in the mold. If a groove or the like in which the base portion is to be arranged is provided at a predetermined position of the mold, the protruding piece is unlikely to be displaced even when pressed by a fluid that is a raw material of the molded body of the composite material. A member that supports the non-magnetic member at the predetermined position of the mold can be omitted or made simple, and accordingly, the first core piece has excellent manufacturability. Furthermore, when compared to the above-described flat plate material, the non-magnetic member including the base portion and the protruding piece is unlikely to be deformed or broken even if the protruding piece is pressed by the above-described fluid. For this reason as well, the first core piece can be accurately molded. For the reasons described above, the reactor according to the present disclosure has excellent manufacturability.

In addition, the first core piece is mainly composed of the molded body of the composite material and therefore the reactor according to the present disclosure has low loss and a small size. Specifically, magnetic situation is unlikely to occur in the molded body of the composite material, when compared to a layered body of electromagnetic steel plates and a pressed powder molded body as described above. Accordingly, the thickness of the protruding piece of the non-magnetic member can be reduced. As a result of the thickness of the protruding piece being small to a certain extent, a magnetic flux leakage from the position where the protruding piece is arranged in the first core piece is reduced. Even if the wound portion and the first core piece are arranged close to each other, a loss due to the magnetic flux leakage, e.g., a copper loss, is reduced. For this reason, the reactor according to the present disclosure has low loss. The composite material contains resin and has an excellent electrical insulation property, and the loss of eddy current is therefore reduced. As a result, an alternating current loss such as an iron loss is reduced, and therefore the reactor according to the present disclosure has low loss.

Furthermore, the reactor according to the present disclosure has a small size because a gap between the wound portion and the first core piece can be made small. The gap between the wound portion and the first core piece can be made small owing to the excellent electrical insulation property described above. Note that the thickness of the protruding piece referred to here is the maximum length of the protruding piece along the axial direction of the first core piece.

In an example configuration of the reactor according to the present disclosure, there is a gate mark in an outer peripheral surface of the molded body of the composite material on a protruding end side of the protruding piece.

This configuration makes it easy to accurately mold the first core piece and further improves manufacturability as described below. This configuration can be typically obtained by introducing the above-described fluid from the protruding end side of the protruding piece of the non-magnetic member toward the base portion side in a manufacturing step of the first core piece. That is, the fluid can be introduced in a direction that extends along the protruding direction of the protruding piece. If the fluid is introduced in the direction extending along the protruding direction, the protruding piece can be easily kept from being displaced, falling over, being deformed, or broken as a result of being pressed by the fluid. Note that the protruding direction of the protruding piece is the same as a direction along which the protruding piece is inserted into the molded body of the composite material.

In an example configuration of the reactor according to the present disclosure, the protruding piece protrudes from the base portion by a length that is greater than ½ of a length of the first core piece along a direction orthogonal to the axial direction, and the maximum length of the protruding piece along the axial direction is shorter than 2 mm.

The protruding piece of the non-magnetic member in this configuration effectively functions as a magnetic gap. Therefore, magnetic saturation is unlikely to occur in this configuration. Also, the maximum length of the protruding piece along the axial direction of the first core piece, i.e., the thickness of the protruding piece is as thin as less than 2 mm. Therefore, a magnetic flux leakage from the position where the protruding piece is arranged in the first core piece is reduced. A reactor having such a configuration has low loss and a small size as described above.

In an example configuration of the reactor according to the present disclosure, a protruding direction of the protruding piece is a direction that extends along a long side of an imaginary rectangle that is the minimum rectangle in which an external shape of a cross section of the molded body of the composite material is included, the cross section being taken by cutting the molded body of the composite material along a plane that is orthogonal to the axial direction of the first core piece.

This configuration makes it easy to make a protruding length of the protruding piece of the non-magnetic member long, when compared to a case where the protruding direction of the protruding piece extends along a short side of the imaginary rectangle. The longer the protruding length of the protruding piece is, the more effectively the protruding piece functions as a magnetic gap. Therefore, magnetic saturation is further suppressed with this configuration.

In an example configuration of the reactor according to the present disclosure, the coil includes two said wound portions that are adjacent to each other, the magnetic core includes a plurality of the first core pieces that include the protruding pieces that are respectively arranged inside of the two wound portions, and the first core pieces are arranged such that the base portions face each other and the protruding pieces are apart from each other.

The protruding pieces of the non-magnetic members in this configuration more effectively function as magnetic gaps, when compared to a case where the first core pieces are arranged such that the protruding pieces face each other and the base portions are apart from each other. Therefore, magnetic saturation is further suppressed with this configuration.

Also, the core pieces including regions thereof that are arranged inside of the respective wound portions are each mainly composed of the molded body of the composite material. Therefore, the core pieces can be easily formed through injection molding or the like. Furthermore, core pieces having the same composition, the same shape, and the same size can be used as the above-described core pieces. That is, the plurality of core pieces can be manufactured using a single mold, the same raw material, and the same manufacturing conditions. For these reasons, this configuration further improves manufacturability.

Furthermore, the core pieces including the regions thereof arranged inside of the respective wound portions are mainly composed of molded bodies of the composite material, and therefore even if the wound portions and the core pieces are arranged close to each other, the reactor of this configuration has low loss as described above. Also, the reactor of this configuration can be made small by arranging the wound portions and the core pieces close to each other.

In an example configuration of the reactor according to the present disclosure, a relative permeability of the molded body of the composite material is at least 5 and no greater than 50, and a relative permeability of a second core piece that is arranged outside of the wound portion is at least two times the relative permeability of the molded body of the composite material.

With this configuration, it is easy to make the reactor small while achieving a large inductance, when compared to a case where the molded body of the composite material and the second core piece have the same relative permeability that is 5 to 50.

Also, the relative permeability of the molded body of the composite material is relatively low. Magnetic saturation is unlikely to occur in a configuration that includes the molded body of the composite material having such a low permeability. Since magnetic saturation is unlikely to occur, the thickness of the protruding piece of the non-magnetic member can be reduced. If the thickness of the protruding piece is small, a magnetic flux leakage from the position where the protruding piece is arranged in the first core piece is reduced. Also, even if the wound portion and the first core piece are arranged close to each other as described above, a loss is reduced. The reactor having such a configuration has low loss and a small size as described above.

Furthermore, with this configuration, a magnetic flux leakage between the second core piece and the first core piece can be reduced. The reactor having such a configuration has low loss because a loss due to the above-described magnetic flux leakage can be reduced.

In an example configuration of the reactor described above in (6), the relative permeability of the second core piece is at least 50 and no greater than 500.

This configuration makes it easy to increase the difference in relative permeability between the second core piece and the first core piece. Therefore, with this configuration, the magnetic flux leakage between the second core piece and the first core piece can be further reduced, and the reactor has lower loss.

In an example configuration of the reactor described above, the reactor includes a resin molded portion that covers at least a portion of the magnetic core.

This configuration includes a plurality of core pieces, but the plurality of core pieces can be held by the resin molded portion. The resin molded portion increases strength of the magnetic core as a single piece, and accordingly the reactor of this configuration has excellent strength. Also, with this configuration, it is possible to improve electrical insulation between the coil and the magnetic core, protect the magnetic core from an external environment, and mechanically protect the magnetic core by using the resin molded portion.

Hereinafter, embodiments of the present disclosure will be described in detail with reference to the drawings. Objects with the same names are denoted by the same reference numerals in the drawings.

First Embodiment

A reactor 1 according to a first embodiment will be described with reference to FIGS. 1 and 2A to 2D.

FIG. 1 is a plan view of the reactor 1 according to the first embodiment viewed from a direction that is orthogonal to both axial directions of wound portions 2*a* and 2*b* of a coil 2 and a direction in which the two wound portions 2*a* and 2*b* are arranged. Here, the axial directions correspond to the left-right direction in FIG. 1. The direction in which the wound portions 2*a* and 2*b* are arranged corresponds to the up-down direction in FIG. 1. The direction orthogonal to these directions corresponds to the direction perpendicular to the sheet face of FIG. 1.

Overview

As shown in FIG. 1, the reactor 1 of the first embodiment includes the coil 2 that includes the wound portions and a magnetic core 3 that is arranged inside and outside of the wound portions. The coil 2 in the present example includes the two wound portions 2*a* and 2*b* that are adjacent to each other. The wound portions 2*a* and 2*b* are arranged such that their axes are parallel to each other. The magnetic core 3 is formed by combining a plurality of core pieces. The magnetic core 3 in the present example includes first core pieces 31 including regions thereof that are respectively arranged inside of the two wound portions 2*a* and 2*b*, and second core pieces 32 that are arranged outside of the wound portions 2*a* and 2*b*. The magnetic core 3 is formed by assembling these core pieces 31 and 32 in a ring shape. The two core pieces 31 are arranged such that their axial directions extend along axial directions of the wound portions 2*a* and 2*b*. The two core pieces 32 are arranged so as to sandwich the core pieces 31. This kind of reactor 1 is typically used by being attached to an installation target (not shown) such as a converter case.

Particularly, the reactor 1 of the first embodiment includes the first core pieces 31 as core pieces constituting the magnetic core 3. The first core pieces 31 each include a molded body 30 of a composite material and a non-magnetic member 7. Specifically, at least one core piece of the plurality of core pieces is the first core piece 31. The molded body 30 of the composite material contains a magnetic powder and a resin. The non-magnetic member 7 is held by the molded body 30 of the composite material such that the non-magnetic member 7 and the molded body 30 constitute a single piece. Also, the non-magnetic member 7 includes a base portion 70 and a protruding piece 71. The base portion 70 is arranged along an outer peripheral surface of the molded body 30 of the composite material. The protruding piece 71 protrudes from the base portion 70. The protruding piece 71 is inserted into a region of the molded body 30 of the composite material that is arranged inside of the wound portion 2*a* or 2*b*. Furthermore, the protruding piece 71 is arranged in the molded body 30 of the composite material such that the protruding piece 71 intersects the axial direction of the first core piece 31.

The first core piece 31 is arranged such that the axial direction of the first core piece 31 extends along the axial direction of the wound portion 2*a* or 2*b*, i.e., a magnetic flux direction of the coil 2. As a result, the protruding piece 71 of the non-magnetic member 7 is arranged so as to intersect the magnetic flux direction of the coil 2. The protruding piece 71 in the present example is arranged to be orthogonal to the magnetic flux direction of the coil 2. Such a protruding piece 71 functions as a magnetic gap and contributes to making magnetic saturation unlikely to occur in the reactor 1. Also, the non-magnetic member 7 and the molded body 30 of the composite material are formed as a single piece to constitute the first core piece 31, and this contributes to a reduction in the number of assembled parts of the reactor 1. Note that the axial direction of the first core piece 31 referred to here corresponds to the longitudinal direction of the core piece 31.

Hereinafter, each constituent element will be described in detail.

Coil

The coil 2 in the present example includes the wound portions 2*a* and 2*b* that have tube shapes and are obtained by winding winding wires (not shown) into spiral shapes. Example configurations of the coil 2 including the two adjacent wound portions 2*a* and 2*b* include the following configurations.

The coil 2 includes the wound portions 2*a* and 2*b* that are formed from two independent winding wires and a connection portion (not shown). The connection portion is formed by connecting end portions on one side of both end portions of the winding wires pulled out from the winding portions 2*a* and 2*b*.

The coil 2 includes the wound portions 2*a* and 2*b* that are formed from one continuous winding wire and a joining portion (not shown). The joining portion is constituted by a portion of the winding wire spanning between the wound portions 2*a* and 2*b* and joins the wound portions 2*a* and 2*b*.

End portions of the winding wire pulled out from the wound portions 2*a* and 2*b* in the configuration (ii) and the other end portions that are not used in the connection portion in the configuration (i) are used as locations to which an external apparatus such as a power source is connected. The connection portion in the configuration (i) may have a configuration in which the end portions of the winding wires are directly connected to each other or a configuration in which the end portions of the winding wires are indirectly connected to each other. Welding, crimping, or the like can be used in the direct connection. Suitable metal fittings or the like that are attached to the end portions of the winding wires can be used in the indirect connection.

Examples of the winding wires include covered wires that include conductor wires and insulating coverings that cover outer peripheries of the conductor wires. Examples of the constituent material of the conductor wires include copper. Examples of the constituent material of the insulating coverings include resins such as polyamide imide. Specific examples of the covered wires include covered flat wires that have a rectangular cross-sectional shape and covered round wires that have a circular cross-sectional shape. Specific examples of wound portions 2*a* and 2*b* formed from flat wires include edgewise coils.

The wound portions 2*a* and 2*b* in the present example are square tube-shaped edgewise coils. Also, specifications such as the shapes, winding directions, and numbers of turns of the wound portions 2*a* and 2*b* are identical in the present example. The shapes, sizes, and the like of the winding wires and the wound portions 2*a* and 2*b* can be changed as appropriate. For example, the wound portions 2*a* and 2*b* may have circular tube shapes. Alternatively, for example, the specifications of the wound portions 2*a* and 2*b* may differ from each other.

Magnetic Core

Overview

The magnetic core 3 in the present example constitutes a closed magnetic path that is formed by combining a total of four core pieces, i.e., the two core pieces 31 and the two core pieces 32 in a ring shape as described above. In the present example, each first core piece 31 is mainly composed of the molded body 30 of the composite material, and includes the non-magnetic member 7 in a region of the molded body 30 of the composite material that is arranged inside of the wound portion 2*a* or 2*b*. Also, in the present example, each second core piece 32 is arranged outside of the wound portions 2*a* and 2*b* and does not include the non-magnetic member 7. The core pieces 31 that are mainly arranged inside of the wound portions 2*a* and 2*b* and the core pieces 32 that are arranged outside of the wound portions 2*a* and 2*b* are independent from each other. In this case, there is more freedom in choosing the constituent materials of the core pieces, particularly the constituent material of the molded bodies 30 of the composite material in the first core pieces 31. In the present example, the constituent material of the core pieces 31 inside the coil 2 and the constituent material of the core pieces 32 outside the coil 2 differ from each other. The constituent materials of both core pieces 31 are the same. Also, the number of core pieces arranged inside of the single wound portion 2*a* or 2*b* is one. Therefore, the number of assembled parts of the magnetic core 3 is small, and consequently the number of assembled parts of the reactor 1 is small. The constituent materials of the core pieces and the number of core pieces can be changed as appropriate.

Shape and Size of Core Pieces

Figure 2A:
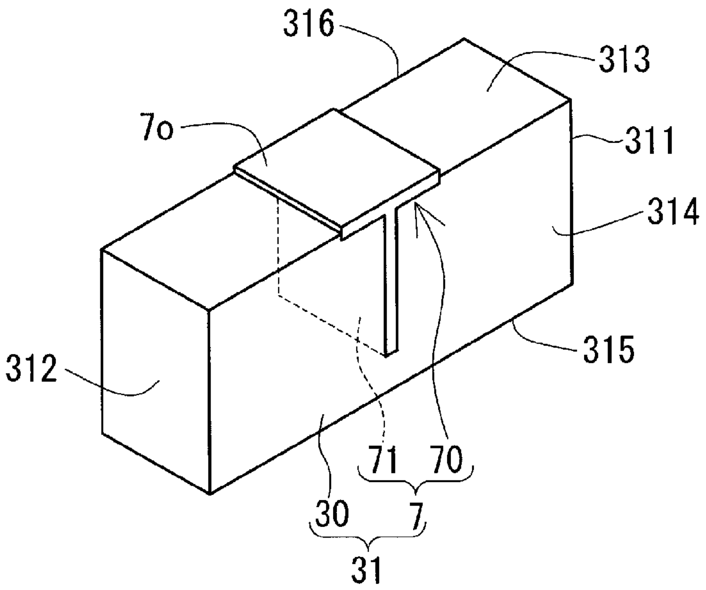
FIG. 2A is a schematic perspective view showing a first core piece included in the reactor according to the first embodiment.
Figure 2B:
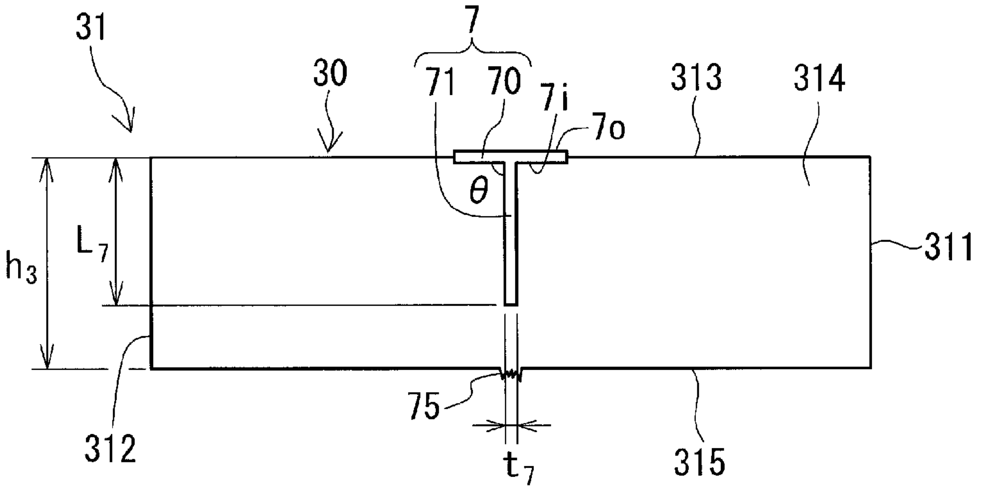
FIG. 2B is a schematic plan view showing the first core piece included in the reactor according to the first embodiment.

In the present example, the two core pieces 31 have the same shape and the same size. Each core piece 31 has an elongated rectangular parallelepiped shape and is arranged such that the longitudinal direction extends along the axial directions of the wound portions 2*a* and 2*b* as described above. The outer peripheral shape of each core piece 31 is approximately analogous to the inner peripheral shapes of the wound portions $2a$ and $2b$. End surfaces 311 and 312 of each core piece 31 have rectangular shapes and the length of the short sides thereof is smaller than the length of the long sides thereof (FIG. 2D). The shape and the size of each core piece 31 are dependent on, and substantially similar to, the shape and the size of the molded body 30 of the composite material, which is the main component. The molded body 30 of the composite material in the present example has an elongated rectangular parallelepiped shape as described above, and outer peripheral surfaces of the molded body 30 include the two end surfaces 311 and 312 and four peripheral surfaces 313 to 316 (FIG. 2A). Hereinafter, in each first core piece 31 or the molded body 30 of the composite material, a direction that extends through the opposite peripheral surfaces 313 and 315 out of directions orthogonal to the axial direction, which is the longitudinal direction in this example, will be referred to as a "height direction". Also, a direction that extends through the opposite peripheral surfaces 314 and 316 out of the directions orthogonal to the axial direction will be referred to as a "width direction".

In the present example, the two core pieces 32 have the same shape and the same size. Each core piece 32 has a rectangular parallelepiped shape. In each core piece 32, a surface to which the two core pieces 31 are connected has an area that is larger than a total area of the two end surfaces 311 and 312.

The sizes of the core pieces 31 and 32 are adjusted according to the constituent materials, the size of the protruding piece 71 of the non-magnetic member 7, and the like so that the reactor 1 satisfies predetermined magnetic characteristics.

Note that the shapes, the sizes, and the like of the core pieces 31 and 32 can be changed as appropriate. For example, the shape of the first core pieces 31 may also be a circular column shape, a polygonal column shape, or the like. Also, the shape of the second core pieces 32 may also be a column shape that includes a dome-shaped surface shown in JP 2017-135334A or a trapezoidal surface, for example. In addition, at least one corner portion of corner portions of a core piece may also be C-chamfered or R-chamfered, for example. A chamfered corner portion is unlikely to be chipped, and a core piece including such a corner portion has excellent mechanical strength. Note that R-chamfered corner portions are shown in the second core pieces 32.

Non-Magnetic Member

Overview

The following describes the non-magnetic member 7 mainly with reference to FIGS. 2A to 2D.

Each first core piece 31 includes at least one non-magnetic member 7. The non-magnetic member 7 is a molded body constituted by a non-magnetic material and includes the base portion 70 and the protruding piece 71. The non-magnetic member 7 in the present example is a single piece member obtained by molding the base portion 70 and the protruding piece 71 as a single piece.

The base portion 70 is typically constituted by a flat plate material as shown in FIG. 2A, and is arranged along an outer peripheral surface of the molded body 30 of the composite material. That is, the base portion 70 is arranged substantially in parallel with the outer peripheral surface of the molded body 30 of the composite material. At least a portion of the surface of the base portion 70, typically, an entire face of the base portion 70 is exposed from the outer peripheral surface of the molded body 30. The face opposite to the exposed face is in contact with, or is embedded in, the molded body 30 of the composite material (FIG. 2B). Hereinafter, the exposed face will be referred to as an "outer surface $7o$". The face opposite to the outer surface $7o$ will be referred to as an "inner surface $7i$". The base portion 70 functions as a member that supports the protruding piece 71 at a predetermined position of the molded body 30 of the composite material. The base portion 70 in the present example has a rectangular shape in a plan view and is constituted by a flat plate material that has a constant thickness.

The protruding piece 71 is typically constituted by a flat plate material as shown in FIG. 2A, and is inserted into the molded body 30 of the composite material. In the present example, the entirety of the protruding piece 71 is embedded in the molded body 30 of the composite material except for side surfaces of the protruding piece 71 (see also FIG. 2D). The side surfaces of the protruding piece 71 are exposed from outer peripheral surfaces of the molded body 30 of the composite material. Alternatively, regions near peripheral edges of the protruding piece 71 including the side surfaces may also be exposed from the outer peripheral surfaces of the molded body 30 of the composite material, or the entirety of the protruding piece 71 may also be embedded in the molded body 30 of the composite material. The protruding piece 71 in the present example has a rectangular shape in a plan view and is constituted by a flat plate material that has a constant thickness.

Also, the protruding piece 71 protrudes from the inner surface $7i$ of the base portion 70 at a predetermined angle with respect to the inner surface $7i$. In the present example, the protruding piece 71 is provided to be orthogonal to the inner surface $7i$ (FIG. 2B). The angle formed between the protruding piece 71 and the inner surface $7i$ is 90°. Therefore, the non-magnetic member 7 in the present example is a T-shaped member (FIGS. 2A and 2B). Hereinafter, the angle described above will be referred to as an "inclination angle θ" (FIG. 2B).

In the present example, the base portion 70 constituted by the rectangular flat plate material is arranged along one of the outer peripheral surfaces, which is the peripheral surface 313 in this example, of the molded body 30 of the composite material having the rectangular parallelepiped shape. The width of the flat plate material constituting the base portion 70 is substantially equal to the width of the molded body 30 of the composite material. The length along the width direction of the molded body 30 of the composite material is referred to as the width of the base portion 70. The protruding piece 71 protrudes from the inner surface $7i$ of the base portion 70 at right angles at a center portion in the length direction of the inner surface $7i$. The length direction is a direction that is parallel with a direction extending along the axial direction of the first core piece 31, and is the left-right direction in FIG. 2B. Such a T-shaped non-magnetic member 7 has a simple shape, and therefore can be easily molded and has excellent manufacturability.

Shape

The shape of the non-magnetic member 7 can be changed as appropriate. The shape of the non-magnetic member 7 can be easily changed by adjusting shapes of members constituting the base portion 70 and the protruding piece 71, the number of protruding pieces 71 provided in the single base portion 70, or the inclination angle θ of the protruding piece 71, for example.

The shape of the base portion 70 in a plan view may also be a circular shape, an elliptical shape, or a polygonal shape, for example. The base portion 70 may also have a shape that includes a curved surface according to the outer peripheral shape of the molded body 30 of the composite material. The base portion 70 in the present example is constituted by the flat plate material that conforms to the peripheral surface 313 of the molded body 30 of the composite material, but if the molded body 30 of the composite material has a circular column shape, for example, the base portion 70 can be constituted by an arcuate plate material. Alternatively, if the molded body 30 of the composite material has a polygonal column shape, for example, the base portion 70 may also be constituted by a member that has a bent shape and is arranged spanning a plurality of peripheral surfaces of outer peripheral surfaces of the polygonal column. The member having the bent shape may be constituted by, for example, a plurality of flat plate materials that are connected to each other to form an angle corresponding to an interior angle that is formed between adjacent peripheral surfaces of the outer peripheral surfaces of the polygonal column.

The shape of the protruding piece 71 in a plan view may also be a U-shape, i.e., a shape that is obtained by adding a semicircle to a rectangle, for example. Alternatively, for example, a peripheral edge of the protruding piece 71 may also be a curved edge such as a wave-shaped edge or a jagged edge, instead of a straight edge. Alternatively, the protruding piece 71 may also be constituted by a curved plate material such as a corrugated plate, for example. Alternatively, the protruding piece 71 may also be constituted by a member that has a variation in thickness, instead of the flat plate material having a constant thickness. The member having a variation in thickness may be, for example, a member of which the thickness changes continuously or stepwise from a side on which the protruding piece 71 is connected to the base portion 70, i.e., a base end side, toward a protruding end side, or a member that has a groove or a through hole. If the protruding piece 71 is constituted by a member having a different shape, such as the plate material including a curved edge, the curved plate material, or the member having a variation in thickness, the area of contact between the protruding piece 71 and the molded body 30 of the composite material increases. Therefore, the non-magnetic member 7 is firmly held by the molded body 30 of the composite material.

Note that, if the protruding piece 71 is constituted by a member having a different shape, the inclination angle θ is determined as described below, for example. Assume the minimum rectangular parallelepiped in which the member having a different shape is included. Take a surface of the rectangular parallelepiped that extends along the protruding direction of the protruding piece 71. Take an angle of the above-described surface of the rectangular parallelepiped relative to the inner surface 7*i* of the base portion 70 to be the inclination angle θ.

In addition, in at least one of the inner surface 7*i* of the base portion 70 and the protruding piece 71, a region that is embedded in the molded body 30 of the composite material may have a rough surface. If the surface roughness Ra is 25 μm or more, for example, an area of the inner surface 7*i* or the protruding piece 71 that comes into contact with the molded body 30 of the composite material increases when compared to a case where the surface is smooth and has a surface roughness Ra less than 6.3 μm. Therefore, the non-magnetic member 7 is firmly held by the molded body 30 of the composite material. The surface roughness Ra can be measured using a commercially available surface roughness measuring device.

The number of protruding pieces 71 provided in the single base portion 70 can be changed as appropriate. For example, a plurality of protruding pieces 71 may also be provided in the single base portion 70. If a plurality of protruding pieces 71 are provided in the single base portion 70, the area of contact between the non-magnetic member 7 and the molded body 30 of the composite material increases. Therefore, the non-magnetic member 7 is firmly held by the molded body 30 of the composite material. For example, the single base portion 70 may also be provided with a plurality of protruding pieces 71 that are spaced apart from each other in the length direction of the base portion 70. In this case, the length of the base portion 70 may also be increased. Alternatively, the single base portion 70 may also be provided with a plurality of protruding pieces 71 that have small widths and are spaced apart from each other in the width direction of the base portion 70. In this case, the width of each protruding piece 71 can be selected according to the width of the base portion 70 and the number of protruding pieces 71. On the other hand, if a single protruding piece 71 is provided in the single base portion 70 as is the case with the present example, it is easy to make the non-magnetic member 7 have a simple shape and a small size. Therefore, the non-magnetic member 7 has excellent manufacturability and can be easily handled.

The inclined state of the protruding piece 71 relative to the base portion 70 is adjusted such that the protruding direction of the protruding piece 71 intersects the axial direction of the first core piece 31 and consequently intersects the magnetic flux direction of the coil 2. Typically, the inner surface 7*i* of the base portion 70 is arranged along the axial direction of the first core piece 31 as is the case with the present example, and the inclination angle θ of the protruding piece 71 substantially corresponds to an intersection angle relative to the axial direction of the first core piece 31. In this case, the protruding direction of the protruding piece 71 is the direction that is inclined by the inclination angle θ relative to the inner surface 7*i* of the base portion 70.

The protruding direction of the protruding piece 71 only needs to intersect the axial direction of the first core piece 31, i.e., intersect the magnetic flux direction of the coil 2. Quantitatively, the inclination angle θ or the intersection angle can be appropriately selected to be greater than 0° and less than 180°. In particular, the closer the protruding direction of the protruding piece 71 is to the direction orthogonal to the magnetic flux direction of the coil 2, i.e., the closer the inclination angle θ is to 90°, the more effectively the protruding piece 71 functions as a magnetic gap and the less likely it is that magnetic saturation occurs in the reactor 1. In the present example, the inclination angle θ is 90° as described above, and the protruding direction of the protruding piece 71 in the present example is orthogonal to the magnetic flux direction described above as shown in FIGS. 1 and 2B. A configuration is also possible in which the protruding piece 71 intersects the inner surface 7*i* of the base portion 70 at an angle other than 90° and the protruding direction of the protruding piece 71 intersects the axial direction of the first core piece 31 at an angle other than 90°. Such a configuration where the inclination angle θ≠90° is described below as a modified example A.

In an example configuration, the protruding direction of the protruding piece 71 is the direction that extends along a long side of an imaginary rectangle that is the minimum rectangle in which the external shape of a cross section of the molded body 30 of the composite material is included, the cross section being taken by cutting the molded body 30 along a plane that is orthogonal to the axial direction of the first core piece 31. The molded body 30 of the composite material in the present example has the rectangular parallelepiped shape. Accordingly, the cross section of the molded body 30 of the composite material taken along the plane orthogonal to the axial direction of the first core piece 31 has a rectangular shape. In this case, the external shape of the molded body 30 of the composite material can be used as is as the imaginary rectangle described above. If the molded body 30 of the composite material has an elliptical column shape or a column shape that includes a racetrack-shaped end surface, the cross section described above is taken. Then, the minimum rectangle in which the external shape of the cross section, e.g., an elliptical shape or a racetrack shape is included is taken to be the imaginary rectangle.

If the protruding direction of the protruding piece 71 extends along the direction of the long side of the above-described imaginary rectangle, the protruding length of the protruding piece 71 is likely to be long, when compared to a case where the protruding direction extends along the direction of a short side of the imaginary rectangle. That is, an insertion depth of the protruding piece 71 in the molded body 30 of the composite material is likely to be deep. The more deeply the protruding piece 71 is inserted into the molded body 30 of the composite material, the more likely it is that the molded body 30 of the composite material is magnetically divided by the protruding piece 71. Such a protruding piece 71 is likely to function as the magnetic gap and magnetic saturation is unlikely to occur in the reactor 1.

The protruding length $L_7$ (FIGS. 2B and 2D) of the protruding piece 71 from the base portion 70 referred to here is the maximum length of the protruding piece 71 along the protruding direction. In the present example, the protruding length $L_7$ is the maximum length along the direction orthogonal to the axial direction of the first core piece 31. Note that a thickness $t_7$ (FIGS. 2B and 2C) of the protruding piece 71, which will be described later, is the maximum length of the protruding piece 71 along the axial direction of the first core piece 31. A width $w_7$ (FIG. 2D) of the protruding piece 71, which will be described later, is the maximum length along a direction that is orthogonal to both the axial direction of the first core piece 31 and the protruding direction.

Size

The size of the non-magnetic member 7, in particular, the thickness $t_7$, the protruding length $L_7$, the width $w_7$, and the like of the protruding piece 71 can be appropriately selected within ranges in which the reactor 1 satisfies predetermined magnetic characteristics.

The larger the thickness $t_7$, the protruding length $L_7$, and the width $w_7$ are, the easier it is to make the volume of the protruding piece 71 large. Magnetic saturation is unlikely to occur in a reactor 1 that includes a protruding piece 71 having a large volume.

On the other hand, the smaller the thickness $t_7$ is, the easier it is to reduce a magnetic flux leakage from the position where the protruding piece 71 is arranged in the first core piece 31. In a case where the side surfaces of the protruding piece 71 are exposed from the outer peripheral surfaces of the molded body 30 of the composite material as is the case with the present example, the smaller the protruding length $L_7$ is, the easier it is to reduce the above-described magnetic flux leakage. For these reasons, even if the wound portions 2*a* and 2*b* and the first core pieces 31 are arranged close to each other, a loss due to the above-described magnetic flux leakage, e.g., a copper loss, is reduced. Also, if the wound portions and the first core pieces are arranged close to each other, the reactor 1 can be easily made small. Therefore, the reactor 1 has low loss and a small size. Furthermore, the smaller the width $w_7$ and the protruding length $L_7$ are, the less likely it is that the protruding piece 71 is displaced, deformed, or broken even if the protruding piece 71 is pressed by a fluid that is a raw material of the molded body 30 of the composite material in a manufacturing step of the first core piece 31. Accordingly, the first core piece 31 can be accurately molded and the reactor 1 has excellent manufacturability.

Depending on the size of the magnetic core 3 or the like, if the thickness $t_7$ is less than 2 mm, for example, a magnetic flux leakage from the position where the protruding piece 71 is arranged in the first core piece 31 is reduced while magnetic saturation is suppressed. Consequently, the reactor 1 has low loss and a small size as described above. In a case where a reduction in loss is desired, for example, the thickness $t_7$ may also be 1.5 mm or less, 1.0 mm or less, or 0.8 mm or less. If the thickness $t_7$ is 0.5 mm or more, for example, magnetic saturation is unlikely to occur in the reactor 1.

If the width $w_7$ is equal to the width of the molded body 30 of the composite material as shown in FIG. 2D, magnetic saturation is unlikely to occur in the reactor 1. Also, the side surfaces of the protruding piece 71 are substantially flush with outer peripheral surfaces, which are the peripheral surfaces 314 and 316 in the present example, of the molded body 30 of the composite material. Therefore, the first core piece 31 can be easily taken out from a mold in the manufacturing step and has excellent manufacturability. The width $w_7$ may also be larger than the width of the molded body 30 of the composite material. For example, the width $w_7$ may also be larger than the width of the molded body 30 of the composite material and no larger than about 1.2 times the width of the molded body 30 of the composite material. In this case, a region near a peripheral edge of the protruding piece 71 protrudes from an outer peripheral surface of the molded body 30 of the composite material, which is at least one of the peripheral surfaces 314 and 316 in the present example. Depending on the protruding amount of the region near the peripheral edge, the region can be used to maintain a gap between the wound portion 2*a* or 2*b* and the molded body 30 of the composite material. Alternatively, the width $w_7$ may also be smaller than the width of the molded body 30 of the composite material. In this case, the entirety of the protruding piece 71 is embedded in the molded body 30 of the composite material. In this case as well, the first core piece 31 can be easily taken out from the mold and has excellent manufacturability.

The protruding length $L_7$ may be longer than ½ of the length of the first core piece 31 along the direction orthogonal to the axial direction. In the present example, the length of the first core piece 31 along the direction orthogonal to the axial direction corresponds to the length along the height direction described above and will be hereinafter referred to as a "height $h_3$". The height $h_3$ corresponds to the distance between the peripheral surfaces 313 and 315 arranged opposite to each other. Also, the height $h_3$ corresponds to the length along the directions of long sides of the rectangular end surfaces 311 and 312 as shown in FIG. 2D. The protruding length $L_7$ in the present example is longer than ½ of the height $h_3$ of the first core piece 31.

If the protruding length $L_7$ is longer than ½ of the height $h_3$ of the first core piece 31, i.e., is longer than 50% of the height $h_3$, the protruding piece 71 effectively functions as the magnetic gap. Therefore, magnetic saturation is unlikely to occur in the reactor 1. The longer the protruding length $L_7$ is, the larger the magnetic gap can be made and the less likely it is that magnetic saturation occurs in the reactor 1. In a case where suppression of magnetic saturation is desired, for example, the protruding length $L_7$ may be at least 55% of the height $h_3$ of the core piece 31 or at least 60% of the height $h_3$.

If the protruding length $L_7$ is shorter than the height $h_3$ of the first core piece 31, i.e., is shorter than 100% of the height $h_3$, the state where the molded body 30 of the composite material and the non-magnetic member 7 constitute a single piece can be maintained. This is because the molded body 30 of the composite material includes a portion that covers the protruding end of the protruding piece 71, and can be kept from being divided into two parts by the protruding piece 71. The smaller the protruding length $L_7$ is, the larger the portion of the molded body 30 of the composite material covering the protruding end of the protruding piece 71 can be made and the easier it is to increase the strength of the core piece 31. Also, in a case where the side surfaces of the protruding piece 71 are exposed from the outer peripheral surfaces of the molded body 30 of the composite material as described above, the smaller the protruding length $L_7$ is, the further the magnetic flux leakage is reduced as described above and the easier it is to make the reactor 1 have low loss and a small size. In a case where an improvement in the strength, a reduction in loss, and a reduction in size are desired, for example, the protruding length $L_7$ may be no longer than 98% of the height $h_3$ of the core piece 31, no longer than 95% of the height $h_3$, or no longer than 90% of the height $h_3$.

The size of the base portion 70, e.g., the thickness, the length, and the width can be appropriately selected within ranges where the base portion 70 can appropriately support the protruding piece 71 particularly in the manufacturing step of the molded body 30 of the composite material.

In the present example, the thickness of the base portion 70 is substantially equivalent to the thickness $t_7$ of the protruding piece 71, but may also be smaller than or larger than the thickness $t_7$. The smaller the thickness of the base portion 70 is, the smaller the weight of the non-magnetic member 7 can be made. The larger the thickness of the base portion 70 is, the more deeply the base portion 70 can be inserted into a groove of the above-described mold in the manufacturing step of the first core piece 31. The more deeply the base portion is inserted into the groove, the more stably the protruding piece 71 can be supported in the mold. Consequently, moldability and manufacturability of the first core piece 31 are improved. Also, if the base portion 70 is thick, a portion of the base portion 70 that is exposed from the molded body 30 of the composite material is likely to be thick. Depending on the thickness of the exposed portion, the exposed portion can be used to maintain a gap between the wound portion 2*a* or 2*b* and the molded body 30 of the composite material.

Note that a portion of the base portion 70 that is inserted into the groove of the mold in the above-described manufacturing step of the first core piece 31 is exposed from the molded body 30 of the composite material. In the present example, an outer region of the base portion 70 in the thickness direction thereof including the outer surface 7*o* corresponds to the exposed portion described above. An inner region of the base portion 70 in the thickness direction thereof including the inner surface 7*i* is embedded in the molded body 30 of the composite material. Note that the outer surface 7*o* or the inner surface 7*i* of the base portion 70 may also be flush with the outer peripheral surface of the molded body 30 of the composite material.

In the present example, the length of the base portion 70 is sufficiently larger than the thickness $t_7$ of the protruding piece 71. The length of the base portion 70 referred to here is the maximum length along the axial direction of the first core piece 31. Quantitatively, the length of the base portion 70 is as long as at least 5 times the thickness $t_7$. As a result of the base portion 70 being long, an inserted area of the base portion 70 that is inserted into the above-described groove of the mold in the manufacturing step of the first core piece 31 can be made large. The larger the inserted area is, the more stably the protruding piece 71 can be supported in the mold. Consequently, moldability and manufacturability of the first core piece 31 are improved. The length of the base portion 70 may also be such that an end portion of the base portion 70 is exposed from the wound portion 2*a* or 2*b*. The shorter the length of the base portion 70 is, the smaller the weight of the non-magnetic member 7 can be made. The length of the base portion 70 may be at least about two times and no greater than about 20 times the thickness $t_7$.

In the present example, the width of the base portion 70 is substantially equivalent to the width $w_7$ of the protruding piece 71, but may also be narrower than or wider than the width $w_7$. The width of the base portion 70 referred to here is the maximum length along the width direction of the first core piece 31. The narrower the width of the base portion 70 is, the smaller the weight of the non-magnetic member 7 can be made. The wider the width of the base portion 70 is, the easier it is to make the above-described inserted area of the base portion 70 large. Consequently, moldability and manufacturability of the first core piece 31 are improved as described above.

Number of Non-Magnetic Members

The first core pieces 31 shown in FIG. 1 each include a single non-magnetic member 7 that includes a single protruding piece 71. Each first core piece 31 may also include a plurality of non-magnetic members 7 (not shown). In a case where the reactor 1 includes a plurality of non-magnetic members 7, the protruding pieces 71 of the respective non-magnetic members 7 are provided at different positions in the axial direction of the first core piece 31, and are inserted into the same direction or different directions relative to the molded body 30 of the composite material. An example configuration in which insertion directions or protruding directions of the plurality of protruding pieces 71 are the same is described below in (1). An example configuration in which insertion directions or protruding directions of the plurality of protruding pieces 71 differ from each other is described below in (2). Assume that each non-magnetic member 7 in the following examples is a T-shaped member such as that in the present example.

The base portions 70 of the respective non-magnetic members 7 are arranged on an outer peripheral surface of the molded body 30 of the composite material, which is selected from the peripheral surfaces 313 to 316. For example, the base portions 70 of all non-magnetic members 7 are arranged on the peripheral surface 313. The protruding pieces 71 of the respective non-magnetic members 7 protrude from the peripheral surface 313 toward the peripheral surface 315. Protruding ends of the protruding pieces 71 are located on the peripheral surface 315 side.

The base portions 70 of the respective non-magnetic members 7 are arranged on two or more outer peripheral surfaces of the molded body 30 of the composite material, which are selected from the peripheral surfaces 313 to 316. The protruding piece 71 of each non-magnetic member 7 protrudes from the peripheral surface on which the base portion 70 is arranged toward the opposite peripheral surface. The protruding end of each protruding piece 71 is located on the opposite peripheral surface side. The protruding pieces 71 are arranged at different positions in the axial direction of the molded body 30 of the composite material such that protruding ends of the respective protruding pieces 71 face each other or intersect each other. In a manufacturing step of this configuration, a member that supports the non-magnetic members 7 at predetermined positions of the mold is used as necessary.

In a case where a single first core piece 31 includes a plurality of non-magnetic members 7, shapes and sizes of the non-magnetic members 7 may be the same or different from each other. If shapes and sizes of the non-magnetic members 7 are the same, the first core piece 31 has a simple shape and can be easily molded. Also, if the single first core piece 31 includes a plurality of non-magnetic members 7, the thickness $t_7$ of each protruding piece 71 can be made small when compared to a case where only one non-magnetic member 7 is included. This is because the thickness of the protruding piece 71 of the case where only one non-magnetic member 7 is included can be distributed to the plurality of protruding pieces 71. Accordingly, if the single first core piece 31 includes a plurality of non-magnetic members 7, magnetic flux leakages from positions where the non-magnetic members 7 are arranged and a loss due to the magnetic flux leakages can be easily reduced.

Formation Position

The non-magnetic member 7 is provided at a suitable position in the axial direction of the molded body 30 of the composite material. In the present example, the non-magnetic member 7 is formed at the center of the first core piece 31 in the axial direction of the first core piece 31. Such a first core piece 31 has a symmetrical shape about a line segment that halves the first core piece 31 in the axial direction.

In a case where the single first core piece 31 includes a plurality of protruding pieces 71 as a result of including a plurality of non-magnetic members 7, for example, if a distance between protruding pieces 71 that are adjacent to each other in the axial direction of the first core piece 31 is set to be wide to a certain extent, the strength of the first core piece 31 can be easily increased. This is because it is easy to suppress a reduction in the strength due to the molded body 30 of the composite material being divided by the plurality of protruding pieces 71, and it is easy to increase the strength of the first core piece 31 as a single piece member. Depending on the number of non-magnetic members 7, the size of the base portions 70, and the like, the distance between adjacent protruding pieces 71 may be at least 10% of the length of the first core piece 31 and less than 50% of the length of the first core piece 31. The distance may also be: the length of the first core piece 31/the number of protruding pieces 71 arranged in the axial direction+1, for example.

Gate Mark

Figure 2C:
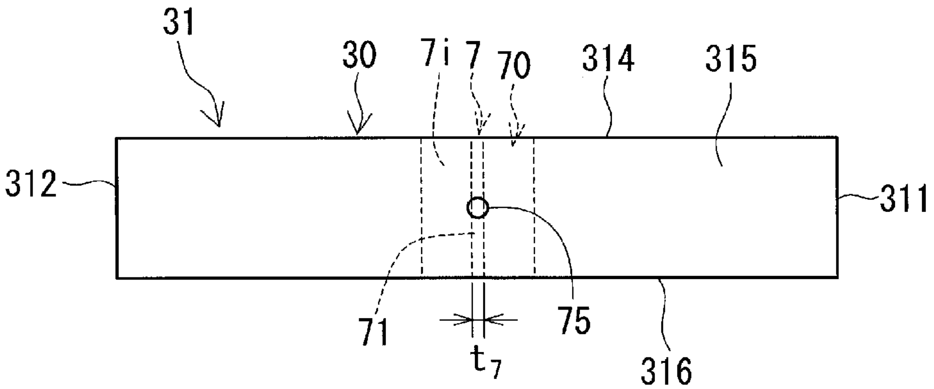
FIG. 2C is a schematic front view showing the first core piece included in the reactor according to the first embodiment.
Figure 2D:
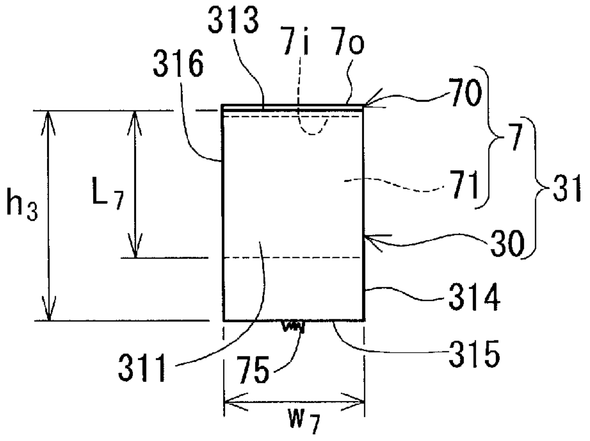
FIG. 2D is a schematic side view of the first core piece included in the reactor according to the first embodiment, viewed from an axial direction of the first core piece.

In addition, the first core piece 31 typically includes a gate mark 75 shown in FIGS. 2B to 2D in an outer peripheral surface of the molded body 30 of the composite material. The gate mark 75 is formed of a residue of a fluid that filled a gate for introducing the fluid, which is the raw material, into a cavity of a mold in a case where the molded body 30 of the composite material is molded through injection molding or the like in the manufacturing step of the first core piece 31. Illustration of the gate is omitted. The gate mark 75 is provided at a position in the molded body 30 of the composite material that corresponds to a position where the gate is provided in the cavity. Therefore, the position of the gate mark 75 in the molded body 30 of the composite material can be changed by adjusting the position where the gate is provided in the cavity.

Note that the gate mark 75 is exaggerated in FIGS. 2B and 2D to facilitate understanding. FIG. 2C shows the gate mark 75 as a circle drawn with a bold line. The shape and the size of the gate mark 75 vary according to the used gate. The gate is, for example, a pin gate or a fan gate. The shape and the size of the gate mark 75 shown in FIGS. 2B to 2D are examples.

In an example configuration, the gate mark 75 is provided in an outer peripheral surface of the molded body 30 of the composite material on the protruding end side of the protruding piece 71 as shown in the present example. Specifically, assume there is an imaginary extension portion of the protruding piece 71 that is extended in the protruding direction. The first core piece 31 includes the gate mark 75 at the position of intersection between the outer peripheral surface of the molded body 30 of the composite material and the imaginary extension portion. Such a first core piece 31 can be typically manufactured by introducing a fluid that is the raw material of the molded body 30 of the composite material from the protruding end side of the protruding piece 71 toward the base portion 70 side, i.e., the base end portion side in the manufacturing step. If the fluid is introduced in the direction extending along the protruding direction of the protruding piece 71, it is easy to keep the protruding piece 71 from being displaced, falling over, being deformed, or broken as a result of being pressed by the fluid. Accordingly, it is easy to accurately mold the first core piece 31 with the protruding piece 71 inserted into the predetermined position of the molded body 30 of the composite material. Consequently, the reactor 1 has excellent manufacturability.

The position of the gate mark 75 can be changed as appropriate. Depending on the size, the inclination angle θ, or the like of the protruding piece 71 of the non-magnetic member 7, the position of the gate mark 75 may also be shifted from the above-described position of intersection in the outer peripheral surface of the molded body 30 of the composite material.

Arrangement State of First Core Piece Relative to Wound Portion

The reactor 1 in the present example includes the coil 2 including the two wound portions 2*a* and 2*b* and the first core pieces 31 including the protruding pieces 71 of the non-magnetic members 7 that are respectively arranged inside of the wound portions 2*a* and 2*b*. In this case, directions of the base portions 70 and the protruding pieces 71 in the respective first core pieces 31 can be appropriately selected. A configuration is possible in which the first core pieces 31 are arranged such that the base portions 70 face each other and the protruding pieces 71 are apart from each other as shown in FIG. 1. Hereinafter, this configuration will be referred to as an "inward configuration". Alternatively, a configuration is also possible in which the first core pieces 31 are arranged such that the protruding pieces 71 face each other and the base portions 70 are apart from each other. Hereinafter, this configuration will be referred to as an "outward configuration". The outward configuration will be described later as a second embodiment.

Alternatively, a configuration is also possible in which the protruding piece 71 of the first core piece 31 that is mainly arranged in the wound portion 2*a* and the protruding piece 71 of the first core piece 31 that is mainly arranged in the other wound portion 2*b* intersect each other, for example, at right angles. Hereinafter, this configuration will be referred to as an "intersecting configuration". An example of the intersecting configuration is the following configuration. In one of the first core pieces 31, the base portion 70 is arranged on the peripheral surface 313 and the protruding piece 71 is arranged to extend from the peripheral surface 313 toward the opposite peripheral surface 315. In the other first core piece 31, the base portion 70 is arranged on the peripheral surface 314 and the protruding piece 71 is arranged to extend from the peripheral surface 314 toward the opposite peripheral surface 316. That is, the non-magnetic members 7 are arranged such that the base portions 70 are arranged in the respective core pieces 31 at positions that are shifted from each other by 90°.

Here, in the ring-shaped magnetic core 3 such as that shown in FIG. 1, the density of a magnetic flux that passes through the magnetic core 3 is likely to be high in an inner periphery side region of the ring when compared to an outer periphery side region of the ring. In the inward configuration in which the base portions 70 face each other and the protruding pieces 71 are apart from each other, it is ensured that the protruding pieces 71 are present in the inner periphery side region where the density of the magnetic flux passing therethrough is likely to be high. Therefore, in the inward configuration, the protruding pieces more effectively function as magnetic gaps and magnetic saturation is less likely to occur, when compared to the outward configuration and the intersecting configuration.

Note that if a plurality of non-magnetic members 7 are provided in a first core piece 31 that is mainly arranged in at least one of the two wound portions 2*a* and 2*b*, the non-magnetic members 7 include at least one of non-magnetic members 7 of the inward configuration, non-magnetic members 7 of the outward configuration, and non-magnetic members 7 of the intersecting configuration.

Constituent Material

The non-magnetic material constituting the non-magnetic member 7 is preferably a non-metal material. This is because a loss such as an eddy current loss can be reduced to make the loss of the reactor 1 low. Examples of non-metal non-magnetic materials include various types of resin and ceramics. In a case where the constituent material of the non-magnetic member 7 is resin, the resin preferably has heat resistance of such an extent that the resin does not deform or melt even if the resin comes into contact with a fluid that is the raw material of the molded body 30 of the composite material in the manufacturing step. For example, a resin that has a thermal deformation temperature of at least 200° C. and preferably at least 250° C. may be used.

Specific examples of resin include thermoplastic resin and thermosetting resin. Examples of thermoplastic resin include polyphenylene sulfide (PPS) resin. Examples of thermosetting resin include unsaturated polyester resin, silicone resin, polyimide resin, and polyamide imide resin. If the constituent material of the non-magnetic member 7 is resin, the non-magnetic member 7 can be easily molded when compared to a case where the constituent material is a ceramic material. Such a non-magnetic member 7 has excellent manufacturability.

Examples of ceramics include alumina. If the constituent material of the non-magnetic member 7 is a ceramic material, the non-magnetic member 7 has excellent rigidity and strength. Therefore, it is easy to keep the protruding piece 71 from being displaced, falling over, being deformed, or broken as a result of being pressed by the above-described fluid in the manufacturing step of the first core piece 31.

Constituent Material of Core Piece

The plurality of core pieces constituting the magnetic core 3 are, for example, molded bodies that are mainly composed of a soft magnetic material. Examples of soft magnetic materials include metals such as iron and iron alloys, e.g., a Fe—Si alloy, a Fe—Ni alloy, etc., and non-metal materials such as ferrite. Examples of the above-described molded bodies include molded bodies of a composite material, pressed powder molded bodies, layered bodies of plate materials composed of the soft magnetic material, and sintered bodies. Molded bodies of the composite material contain a magnetic powder and resin. Details of the molded bodies of the composite material will be described later. Details of pressed powder molded bodies will be described later. Layered bodies of plate materials are typically obtained by stacking plate materials such as electromagnetic steel plates. A typical example of sintered bodies is a ferrite core. It is possible to use any of the following configurations: a configuration in which constituent materials of all core pieces are the same, a configuration in which constituent materials of all core pieces differ from each other, and a configuration in which constitutional materials of some of the core pieces are the same as is the case with the present example. However, out of the plurality of core pieces constituting the magnetic core 3, the first core pieces 31 including the non-magnetic members 7 are constituted by molded bodies of the composite material.

Molded Body of Composite Material

In the molded bodies of the composite material, the amount of magnetic powder contained in the composite material is at least 30 vol % and no greater than 80 vol %, for example. The amount of resin contained in the composite material is at least 10 vol % and no greater than 70 vol %, for example. The larger the amount of magnetic powder is and the smaller the amount of resin is, the easier it is to increase a saturation magnetic flux density and a relative permeability and to enhance heat dissipation. In a case where an increase in the saturation magnetic flux density, an increase in the relative permeability, and enhancement of heat dissipation are desired, for example, the amount of magnetic powder may be at least 50 vol %, at least 55 vol %, or at least 60 vol %. The smaller the amount of magnetic powder is and the larger the amount of resin is, the easier it is to improve electrical insulation to reduce an eddy current loss. The composite material has excellent fluidity in the manufacturing step. In a case where a reduction in loss and an improvement in fluidity are desired, for example, the amount of magnetic powder may be no greater than 75 vol % or no greater than 70 vol %. Alternatively, the amount of resin may be greater than 30 vol %.

In the molded bodies of the composite material, the saturation magnetic flux density and the relative permeability can be easily varied not only by adjusting the amount of magnetic powder and the amount of resin as described above, but also by adjusting the composition of the magnetic powder. The composition of the magnetic powder, the amount of magnetic powder, the amount of resin, and the like can be adjusted such that the reactor 1 has predetermined magnetic characteristics, for example, a predetermined inductance.

Examples of the resin contained in the composite material constituting the molded bodies include thermosetting resin, thermoplastic resin, normal-temperature curable resin, and low-temperature curable resin. Examples of thermosetting resin include unsaturated polyester resin, epoxy resin, urethane resin, and silicone resin. Examples of thermoplastic resin include PPS resin, polytetrafluoroethylene (PTFE) resin, liquid crystal polymers (LCPs), polyamide (PA) resins such as nylon 6 and nylon 66, polybutylene terephthalate (PBT) resin, and acrylonitrile-butadiene-styrene (ABS) resin. In addition, a BMC (Bulk Molding Compound) in which calcium carbonate and glass fibers are mixed with unsaturated polyester, millable silicone rubber, and millable urethane rubber, and the like can be used.

The molded bodies of the composite material may also contain powder of a non-magnetic material in addition to the magnetic powder and the resin. Examples of non-magnetic materials include ceramics such as alumina and silica and various metals. If the molded bodies of the composite material contain powder of a non-magnetic material, heat dissipation can be enhanced. Also, powder of a non-metal non-magnetic material such as a ceramic material has an excellent electrical insulation property and therefore is preferable. The amount of powder of a non-magnetic material may be at least 0.2 mass % and no greater than 20 mass %, for example. This amount may also be set to be at least 0.3 mass % and no greater than 15 mass %, or at least 0.5 mass % and no greater than 10 mass %.

The molded bodies of the composite material can be manufactured using a suitable molding method such as injection molding or cast molding. Typically, the raw material containing the magnetic powder and the resin is prepared, a mold is filled with the raw material in the state of a fluid, and thereafter the fluid is solidified. It is possible to use, as the magnetic powder, powder of the soft magnetic material described above or a powder constituted by powder particles that include coating layers made of an insulating material on surfaces thereof.

In particular, the first core piece 31 including the non-magnetic member 7 can be manufactured using a mold that includes a groove for supporting the molded body 30 of the composite material in a cavity as described above. A member that supports the non-magnetic member 7 may also be attached to the mold as necessary.

Pressed Powder Molded Body

Pressed powder molded bodies are typically obtained by molding a powder mixture that contains the above-described magnetic powder and a binder into a predetermined shape through compression molding and then performing heat treatment. Resin can be used as the binder, for example. The amount of binder is about no greater than 30 vol %, for example. When the heat treatment is performed, the binder disappears or is converted to a thermally modified substance. Therefore, the amount of magnetic powder can be easily increased in the pressed powder molded bodies, when compared to the molded bodies of the composite material. The amount of magnetic powder contained in the pressed powder molded bodies is greater than 80 vol %, or at least 85 vol %, for example. As a result of containing a large amount of magnetic powder, the pressed powder molded bodies tend to have a high saturation magnetic flux density and a high relative permeability, when compared to the molded bodies of the composite material containing resin.

Magnetic Characteristics

In each first core piece 31, the relative permeability of the molded body 30 of the composite material is at least 5 and no greater than 50, for example. The relative permeability of the molded body 30 of the composite material may also be at least 10 and no greater than 45, or may also be further reduced to be no greater than 40, no greater than 35, or no greater than 30. Magnetic saturation is unlikely to occur in a reactor 1 that includes a magnetic core 3 including the molded body 30 of the composite material having such a low permeability. Therefore, the thickness $t_7$ of the protruding piece 71 of the non-magnetic member 7 can be reduced. If the thickness $t_7$ of the protruding piece 71 is small, a magnetic flux leakage from the position where the protruding piece 71 is arranged is reduced. Consequently, the reactor 1 has low loss and a small size as described above.

The relative permeability of the second core pieces 32 arranged outside of the wound portions **2*a* and 2*b* is preferably greater than the relative permeability of the molded body 30 of the composite material described above. One of reasons for this is that a magnetic flux leakage between the first core pieces 31 and the second core pieces 32 can be reduced. Consequently, a loss due to the magnetic flux leakage is reduced, and the reactor 1 has low loss. Another reason is that it is easy to make the reactor 1 small while achieving a large inductance, when compared to a case where the relative permeability of the molded body 30 of the composite material is 5 to 50, for example, and the relative permeability of the second core pieces 32 is equal to the relative permeability of the molded body 30** of the composite material.

In particular, if the relative permeability of the second core pieces 32 is at least two times the relative permeability of the molded body 30 of the composite material, a magnetic flux leakage between the first core pieces 31 and the second core pieces 32 is more reliably reduced. The larger the difference between the relative permeability of the molded body 30 of the composite material and the relative permeability of the second core pieces 32 is, the easier it is to reduce the magnetic flux leakage. In a case where a reduction in loss is desired, for example, the relative permeability of the second core pieces 32 may be at least 2.5 times, at least 3 times, at least 5 times, or at least 10 times the relative permeability of the molded body 30 of the composite material.

The relative permeability of the second core pieces 32 may be at least 50 and no greater than 500, for example. The relative permeability of the second core pieces 32 may also be further increased to be at least 80, at least 100, at least 150, or at least 180. If the core pieces 32 have such a high permeability, it is easy to increase the difference in relative permeability between the core pieces 32 and the molded body 30 of the composite material. For example, if the relative permeability of the molded body 30 of the composite material is 50 and the relative permeability of the second core pieces 32 is at least 100, the relative permeability of the second core pieces 32 is at least two times the relative permeability of the molded body 30 of the composite material. If the above-described difference in relative permeability is large, the magnetic flux leakage between the first core pieces 31 and the second core pieces 32 can be further reduced as described above, and the reactor 1 has lower loss. Also, the larger the relative permeability of the second core pieces 32 is, the smaller the second core pieces 32 can be made relative to the first core pieces 31. For this reason, the reactor 1 can have a smaller size.

Here, the relative permeability is determined as described below.

A ring-shaped sample that has the same composition as the molded body 30 of the composite material included in the first core piece 31 and a ring-shaped sample that has the same composition as the second core pieces 32 are prepared. The ring-shaped samples each have an outer diameter of 34 mm, an inner diameter of 20 mm, and a thickness of 5 mm.

A winding wire is wound around each of the ring-shaped samples by 300 turns on the primary side and 20 turns on the secondary side, and a B-H initial magnetization curve is measured in a range where H=0 (Oe) to 100 (Oe).

The maximum value of B/H in the obtained B-H initial magnetization curve is determined. The maximum value is taken to be the relative permeability. The magnetization curve referred to here is what is called a direct current magnetization curve.

The ring-shaped sample that is used in the measurement of the relative permeability of the molded body 30 of the composite material does not include the non-magnetic member 7.

Each first core piece 31 in the present example is mainly composed of the molded body 30 of the composite material. The second core pieces 32 in the present example are constituted by pressed powder molded bodies. The relative permeability of the molded body 30 of the composite material is at least 5 and no greater than 50. The relative permeability of the second core pieces 32 is at least 50 and no greater than 500 and is at least two times the relative permeability of the molded body 30 of the composite material.

Note that, in the present example, the molded bodies 30 of the composite material included in the respective first core pieces 31 have the same composition. Therefore, relative permeabilities of the molded bodies 30 of the composite material are substantially equal to each other. The molded bodies 30 of the composite material included in the respective first core pieces 31 may also have different compositions.

Holding Member

In addition, the reactor 1 may also include a holding member 5 that is interposed between the coil 2 and the magnetic core 3. FIG. 1 virtually shows the holding member 5 with two-dot chain lines.

The holding member 5 is typically constituted by an electrically insulating material and contributes to an improvement in electrical insulation between the coil 2 and the magnetic core 3. Also, the holding member 5 is used to position the core pieces 31 and 32 relative to the wound portions 2*a* and 2*b* by holding the wound portions 2*a* and 2*b* and the core pieces 31 and 32. The holding member 5 typically holds the core pieces 31 such that predetermined gaps are formed between the wound portions 2*a* and 2*b* and the core pieces 31. In a case where the reactor 1 includes a resin molded portion 6, which will be described later, the gaps can be used as flow paths for a fluid state resin. Accordingly, the holding member 5 also contributes to forming the flow paths in a manufacturing step of the resin molded portion 6.

The holding member 5 shown in FIG. 1 is a rectangular frame-shaped member that is located at positions where end portions of the first core pieces 31 are in contact with the second core pieces 32 and in the vicinities of the positions. The holding member 5 includes, for example, through holes, support pieces, coil side groove portions, and core side groove portions, which will be described below. Details of the holding member 5 are not illustrated. An outer interposed portion 52 in JP 2017-135334A can be referred to as a portion that has a similar shape. In the following description, sides of the holding member 5 on which the second core pieces 32 are arranged will be referred to as “core sides”. Sides of the holding member 5 on which the wound portions 2*a* and 2*b* are arranged will be referred to as “coil sides”.

The through holes extend from the core sides to the coil sides of the holding member 5, and the first core pieces 31 are inserted into the through holes. The support pieces protrude from portions of inner peripheral surfaces that form the through holes, and support portions, e.g., corner portions, of outer peripheral surfaces of the first core pieces 31. When the first core pieces 31 are held by the support pieces, gaps that correspond to thicknesses of the support pieces are formed between the wound portions 2*a* and 2*b* and the first core pieces 31. The coil side groove portions are provided on the coil sides of the holding member 5, and end faces of the wound portions 2*a* and 2*b* and regions near the end faces are fitted in the coil side groove portions. The core side groove portions are provided on the core sides of the holding member 5, and surfaces of the second core pieces 32 that are in contact with the first core pieces 31 and regions near the surfaces are fitted in the core side groove portions.

The shape, size, and the like of the holding member 5 can be changed as appropriate so long as the holding member 5 has the above-described function. Also, a known configuration can be used in the holding member 5. For example, the holding member 5 may also include a member that is independent of the above-described frame-shaped member and is arranged between the wound portions 2*a* and 2*b* and the core pieces 31. The inner interposed portion 51 in JP 2017-135334A can be referred to as a portion that has a similar shape.

The constituent material of the holding member 5 may be an electrically insulating material such as resin. Specific examples of resin are described above with respect to the molded bodies of the composite material. Typical examples of resin include thermoplastic resin and thermosetting resin. The holding member 5 can be manufactured using a known molding method such as injection molding.

Resin Molded Portion

In addition, the reactor 1 may also include the resin molded portion 6 that covers at least a portion of the magnetic core 3. FIG. 1 virtually shows the resin molded portion 6 with a two-dot chain line.

The resin molded portion 6 functions to protect the magnetic core 3 from an external environment, mechanically protect the magnetic core 3, and improve electrical insulation between the magnetic core 3 and the coil 2 or a component in a surrounding region by covering at least a portion of the magnetic core 3. If the resin molded portion 6 covers the magnetic core 3 and does not cover outer peripheries of the wound portions 2*a* and 2*b* to expose the outer peripheries as shown in FIG. 1, the reactor 1 has excellent heat dissipation performance. This is because a cooling medium such as a liquid refrigerant can be brought into direct contact with the wound portions 2*a* and 2*b*.

In an example configuration, the resin molded portion 6 includes inner resin portions 61 and outer resin portions 62 as shown in FIG. 1. The inner resin portions 61 are present inside the wound portions 2*a* and 2*b* and cover at least portions of the first core pieces 31. The outer resin portions 62 are present outside the wound portions 2*a* and 2*b* and cover at least portions of the second core pieces 32. A configuration is also possible in which the resin molded portion 6 is a single piece molded body in which the inner resin portions 61 are continuous to the outer resin portions 62, and holds the core pieces 31 and 32 constituting the magnetic core 3 as a single piece. If the core pieces 31 and 32 constituting the magnetic core 3 are held as a single piece by the resin molded portion 6, rigidity of the magnetic core 3 as the single piece is increased, and the reactor 1 has excellent strength.

Areas that are covered by the inner resin portions 61 and the outer resin portions 62 and thicknesses and the like of the inner resin portions 61 and the outer resin portions 62 can be appropriately selected. For example, the resin molded portion 6 may also cover the entire outer peripheral surface of the magnetic core 3. Alternatively, a configuration is also possible in which the outer resin portions 62 do not cover portions of the second core pieces 32 to expose the portions. Also, the resin molded portion 6 may have a substantially uniform thickness or have a local variation in thickness. In addition, the resin molded portion 6 may also be configured such that the inner resin portions 61 only cover portions of the first core pieces 31 that are joined with the second core pieces 32 and the vicinities of the portions. Alternatively, a configuration is also possible in which the resin molded portion 6 does not include the inner resin portions 61 and substantially covers only the second core pieces 32.

Various types of resin may be used as the constituent material of the resin molded portion 6. For example, thermoplastic resin may be used. Examples of thermoplastic resin include PPS resin, PTFE resin, LCP, PA resin, and PBT resin. The constituent material may also contain a powder that has an excellent heat conduction property or powder of the above-described non-magnetic material, in addition to the resin. A resin molded portion 6 that contains such a powder has an excellent heat dissipation property. In addition, if the resin constituting the resin molded portion 6 is the same as the resin constituting the holding member 5, the resin molded portion 6 and the holding member 5 can be favorably bonded. Also, the resin molded portion 6 and the holding member 5 have the same thermal expansion coefficient, and therefore the resin molded portion 6 can be kept from separating or cracking due to thermal stress. The resin molded portion 6 can be molded through injection molding or the like.

Manufacturing Method of Reactor

The reactor 1 in the first embodiment can be manufactured by preparing the core pieces 31 and 32 and attaching the coil 2, for example. The holding member 5 is attached as appropriate. A reactor 1 that includes the resin molded portion 6 can be manufactured by placing the coil 2, the magnetic core 3, and the holding member 5, which are assembled, in a mold for the resin molded portion 6, and covering the magnetic core 3 with a fluid state resin. Illustration of the mold is omitted.

The first core pieces 31 each including the molded body 30 of the composite material and the non-magnetic member 7 can be manufactured through injection molding or the like by using a mold that includes a groove for supporting the base portion 70 of the non-magnetic member 7 in a cavity as described above, for example. The non-magnetic member 7 having a predetermined shape and a predetermined size can be separately manufactured. As a result of the base portion 70 being arranged in the groove of the mold, a state where the protruding piece 71 stands in the cavity is maintained. In this state, a fluid that is the raw material of the molded body 30 of the composite material can be introduced from the protruding end side of the protruding piece 71 as described above, for example. In the present example, the first core pieces 31 have the same shape and the same size. The molded bodies 30 of the composite material have the same shape, the same size, and the same composition. The non-magnetic members 7 have the same shape and the same size, and is constituted by the same constituent material. Therefore, the plurality of first core pieces 31 can be manufactured using the single mold. Also, the plurality of first core pieces 31 can be manufactured using the same raw material under the same manufacturing conditions.

The resin molded portion 6 can be manufactured using a unidirectional filling method in which a fluid state resin is introduced to flow from one of the core pieces 32 toward the other core piece 32. Alternatively, it is also possible to use two-directional filling method in which the fluid state resin is introduced to flow from the two core pieces 32 toward the inside of the wound portions 2*a* and 2*b*.

Application

The reactor 1 of the first embodiment can be used as a component of a circuit that performs a voltage step-up operation or a voltage step-down operation, and for example, can be used as a constituent component of various types of converters and power conversion apparatuses. Examples of converters include an in-vehicle converter (typically a DC-DC converter) mounted in a vehicle such as a hybrid automobile, a plug-in hybrid automobile, an electric automobile, or a fuel cell automobile, and a converter for an air conditioner.

Major Effects

In the reactor 1 of the first embodiment, the protruding piece 71 of the non-magnetic member 7 included in the first core piece 31 can be used as a magnetic gap. The first core piece 31 is mainly composed of the molded body 30 of the composite material and the resin contained in the composite material also functions as a magnetic gap, and therefore magnetic saturation is unlikely to occur. For these reasons, magnetic saturation is unlikely to occur in the reactor 1 even if a large current value is used.

Also, in the reactor 1 of the first embodiment, the molded body 30 of the composite material and the non-magnetic member 7, which constitute the first core piece 31, are formed as a single piece. Therefore, a member that maintains a gap between adjacent core pieces, a gap plate, or the like is unnecessary, the number of assembled parts is small, and the reactor 1 can be easily assembled. There is no need to bond the core pieces and the gap plate with an adhesive, and the time it takes to solidify the adhesive can be eliminated. Therefore, the reactor 1 has excellent manufacturability.

The first core piece 31 is mainly composed of the molded body 30 of the composite material, and therefore the non-magnetic member 7 and the molded body 30 of the composite material can be formed into a single piece at the same time when the molded body 30 is molded through injection molding or the like. Furthermore, the non-magnetic member 7 includes the base portion 70 and the protruding piece 71, and therefore the non-magnetic member 7 can be easily supported at a predetermined position in the mold, and an additional support member or the like is unnecessary. Also, the protruding piece 71 of such a non-magnetic member 7 can be easily kept from being displaced, deformed, or broken even if pressed by a fluid that is the raw material of the molded body 30 of the composite material. For these reasons, the first core piece 31 can be easily and accurately molded. Consequently, the reactor 1 has excellent manufacturability.

Furthermore, the reactor 1 of the first embodiment has the following effects.

The protruding pieces 71 of the non-magnetic members 7 are arranged inside of the wound portions 2*a* and 2*b*. Therefore, magnetic flux leakages from positions where the protruding pieces 71 are arranged are reduced when compared to a case where the protruding pieces 71 are arranged outside of the wound portions 2*a* and 2*b*. Therefore, the reactor 1 can reliably have a predetermined inductance.

Magnetic saturation is unlikely to occur in the first core piece 31 mainly composed of the molded body 30 of the composite material, when compared to a layered body of electromagnetic steel plates and a pressed powder molded body. Therefore, the thickness $t_7$ of the protruding piece 71 of the non-magnetic member 7 can be reduced. If the thickness $t_7$ of the protruding piece 71 is small, a magnetic flux leakage from the position where the protruding piece 71 is arranged is reduced. Even if the wound portions 2*a* and 2*b* and the first core pieces 31 are arranged close to each other, a loss due to the magnetic flux leakage, e.g., a copper loss, is reduced. Furthermore, the first core pieces 31 have an excellent electrical insulation property as a result of containing resin, and therefore the wound portions 2*a* and 2*b* and the first core pieces 31 can be arranged close to each other. If the wound portions and the first core pieces are arranged close to each other, the reactor 1 can be easily made small. Therefore, the reactor 1 has low loss and a small size.

The molded body 30 of the composite material has an excellent electrical insulation property as a result of containing resin, and therefore an eddy current loss is reduced. An alternating current loss such as an iron loss is reduced, and therefore the reactor 1 has low loss.

Furthermore, the reactor 1 in the present example has the following effects.

The core pieces including regions thereof that are arranged inside of the wound portions 2*a* and 2*b* are the first core pieces 31 and are mainly composed of the molded bodies 30 of the composite material. The plurality of core pieces can be easily formed through injection molding or the like, and therefore the reactor 1 has excellent manufacturability. Also, if the core pieces including the regions thereof arranged inside of the wound portions 2*a* and 2*b* are the first core pieces 31, magnetic flux leakages from positions where the protruding pieces 71 of the non-magnetic members 7 are arranged are reduced as described above. Therefore, the reactor 1 has lower loss and a smaller size.

The first core pieces 31 mainly arranged in the wound portions 2*a* and 2*b* are arranged in the inward configuration described above. In the inner periphery side region of the ring-shaped magnetic core 3 where the density of the magnetic flux passing therethrough is likely to be high, the protruding pieces 71 of the first core pieces 31 are arranged so as to extend orthogonal to the magnetic flux direction. Therefore, magnetic saturation is more reliably suppressed and is unlikely to occur in the reactor 1.

Second Embodiment

Figure 3:
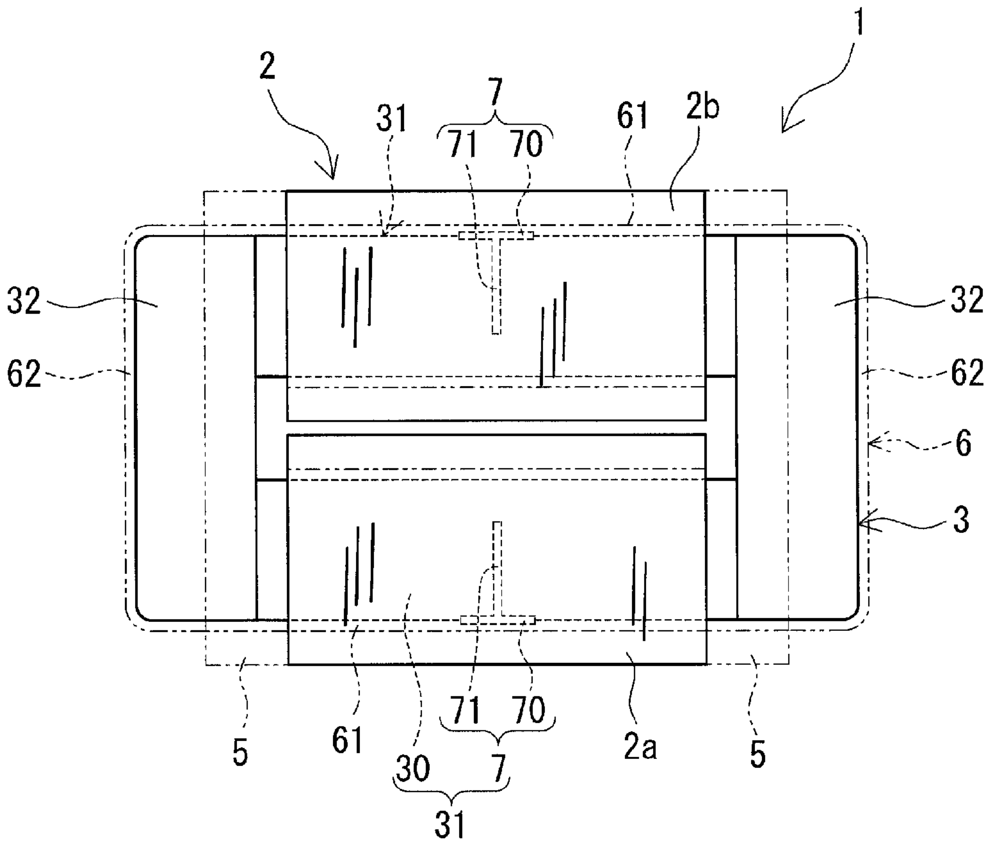
FIG. 3 is a schematic plan view showing a reactor according to a second embodiment.

The following describes a reactor 1 of a second embodiment mainly with reference to FIG. 3.

The basic configuration of the reactor 1 of the second embodiment is the same as that in the first embodiment. The second embodiment differs from the first embodiment mainly in arrangement of the non-magnetic members 7 in the first core pieces 31 mainly arranged inside of the wound portions 2*a* and 2*b*. The reactor 1 of the second embodiment has the outward configuration described above. The following describes the difference in detail and omits detailed descriptions of configurations and effects that overlap those in the first embodiment.

In the reactor 1 of the second embodiment, the coil 2 includes the two wound portions 2*a* and 2*b*, and the magnetic core 3 includes the first core pieces 31 that include the protruding pieces 71 of the non-magnetic members 7 that are respectively arranged inside of the wound portions 2*a* and 2*b*. The first core pieces 31 are arranged such that the protruding pieces 71 face each other and the base portions 70 are apart from each other. FIG. 3 shows a case where the base portion 70 of the non-magnetic member 7 arranged in the wound portion 2*a* is located on the lower side in FIG. 3, and the base portion 70 of the non-magnetic member 7 arranged in the other wound portion 2*b* is located on the upper side in FIG. 3.

The reactor 1 of the second embodiment is attached to an installation target (not shown) such that the lower side in FIG. 3 is close to the installation target and the upper side in FIG. 3 is far from the installation target, for example. In this case, it can be said that, in the non-magnetic member 7 arranged in the wound portion 2*a* that is close to the installation target, the protruding piece 71 is arranged on the side close to the installation target. Also, it can be said that, in the non-magnetic member 7 arranged in the other wound portion 2*b* that is far from the installation target, the protruding piece 71 is arranged far from the installation target.

Major Effects

The reactor 1 having the outward configuration has excellent heat dissipation performance in the state where the protruding piece 71 of the non-magnetic member 7 is arranged on the side close to the installation target, as described below.

It is likely that heat is generated in the wound portion 2*a* due to a magnetic flux leakage from the position where the protruding piece 71 included in the wound portion 2*a* side first core piece 31 is arranged. However, the protruding piece 71 is near a region of the wound portion 2*a* that is close to the installation target, which is a region on the lower side in FIG. 3. This region will be referred to as an "installation side region". As a result of the installation side region of the wound portion 2*a* being cooled by the installation target, the first core piece 31 and the wound portion 2*a* can efficiently conduct heat to the installation target. In the present example, the coil 2 and the magnetic core 3 are arranged such that the axes of the wound portions 2*a* and 2*b* coincide with the axes of the first core pieces 31. A configuration is also possible in which the axis of the wound portion 2*a* side first core piece 31 is shifted relative to the axis of the wound portion 2*a* such that the axis of the first core piece 31 gets closer to the installation target. In this case, the protruding piece 71 included in the wound portion 2*a* side first core piece 31 gets closer to the installation side region of the wound portion 2*a*. Therefore, the first core piece 31 and the wound portion 2*a* can efficiently conduct heat to the installation target.

It is likely that heat is generated in the other wound portion 2*b* due to a magnetic flux leakage from the position where the protruding piece 71 included in the wound portion 2*b* side first core piece 31 is arranged. However, the protruding piece 71 is near a region of the wound portion 2*b* that is far from the installation target, which is a region on the upper side in FIG. 3. The side of the wound portion 2*b* that is far from the installation target is close to an external environment, when compared to the wound portion 2*a*, and can be easily cooled by the external environment. If a cooling mechanism (not shown) is arranged near the wound portion 2*b*, the first core piece 31 and the wound portion 2*b* can efficiently conduct heat to the cooling mechanism. For this reason as well, the reactor 1 has excellent heat dissipation performance. Even if the axis of the wound portion 2*b* and the axis of the first core piece 31 are shifted as described above, the first core piece 31 and the wound portion 2*b* can efficiently conduct heat to the external environment and the cooling mechanism.

The present disclosure is not limited to these examples but is indicated by the claims, and all modifications that fall within the meaning and range of equivalency with the claims are intended to be encompassed therein.

For example, at least one of the following modifications is possible in the above-described first and second embodiments.

Modified Example A

The protruding piece of the non-magnetic member intersects the axial direction of the first core piece at an angle other than 90°.

In this case, the length of the protruding piece along the protruding direction is likely to be long. Accordingly, the area of contact between the protruding piece and the molded body of the composite material is increased. Therefore, the non-magnetic member is firmly held by the molded body of the composite material.

Modified Example B

All core pieces constituting the magnetic core are mainly composed of molded bodies of the composite material.

In this configuration, magnetic saturation is less likely to occur, when compared to the first embodiment that includes molded bodies of the composite material and pressed powder molded bodies, for example. Therefore, the thickness of the protruding piece of the non-magnetic member can be reduced. The reactor has low loss because a magnetic flux leakage from the position where the protruding piece is arranged is reduced. Also, each core piece has an excellent electrical insulation property, and an eddy current loss is reduced. An alternating current loss such as an iron loss is reduced, and therefore the reactor has low loss.

Modified Example C

The number of core pieces constituting the magnetic core is two, three, or five or more.

As the number of core pieces is reduced, the number of assembled parts of the reactor is reduced and manufacturability of the reactor is improved. As the number of core pieces is increased, the freedom in choosing constituent materials of the core pieces is increased as described in the first embodiment, and magnetic characteristics and the like can be easily adjusted.

In cases where the number of core pieces is two, the following configurations are possible: a configuration that includes two U-shaped core pieces, a configuration that includes two L-shaped core pieces, and a configuration that includes a U-shaped core piece and an I-shaped core piece. In any of these configurations, a core piece that includes a molded body of the composite material and the non-magnetic member can be included, and the protruding piece of the non-magnetic member can be arranged at a position of the core piece that is arranged in a wound portion.

Modified Example D

In a case where the coil includes two wound portions, a core piece that includes a region thereof arranged inside of one of the wound portions is the first core piece including the molded body of the composite material and the non-magnetic member, and a core piece that includes a region thereof arranged inside of the other wound portion is a core piece other than the first core piece.

For example, the core piece other than the first core piece may be a pressed powder molded body.

Modified Example E

A core piece that includes a region thereof arranged in a wound portion has an outer peripheral shape that is not analogous to an inner peripheral shape of the wound portion.

This configuration makes it easy to make a gap between the wound portion and the core piece wide. Therefore, a loss due to a magnetic flux leakage from the position where the protruding piece is arranged in the non-magnetic member, e.g., a copper loss, can be reduced.

Modified Example F

The reactor includes at least one of the following (none are shown in the drawings).

(F-1) The reactor includes a sensor that measures a physical amount of the reactor, such as a temperature sensor, a current sensor, a voltage sensor, or a magnetic flux sensor.

(F-2) The reactor includes a heat dissipation plate that is attached to at least a portion of outer peripheral surfaces of the wound portions of the coil.

Examples of the heat dissipation plate include a metal plate and a plate material composed of a non-metal inorganic material with an excellent thermal conductivity. In particular, if the heat dissipation plate is provided on a wound portion in which the first core piece including the non-magnetic member is arranged, the reactor has excellent heat dissipation performance, which is preferable. This is because, in the wound portion in which the first core piece including the non-magnetic member is arranged, it is likely that heat is generated due to a magnetic flux leakage from the position where the protruding piece is arranged in the non-magnetic member, as described above. The heat dissipation plate may also be provided on a wound portion in which the first core piece is not arranged.

(F-3) The reactor includes a bonding layer that is interposed between an installation surface of the reactor and the installation target, or between the installation surface and the above-described heat dissipation plate.

Examples of the bonding layer include an adhesive layer. If an adhesive layer that has an excellent electrical insulation property is used, even if the heat dissipation plate is a metal plate, insulation between the wound portion and the heat dissipation plate is improved by the adhesive layer, which is preferable.

(F-4) The reactor includes an attachment portion for fixing the reactor to the installation target, the attachment portion and an outer resin portion being molded as a single piece.

The invention claimed is:

1. A reactor comprising:

a coil that includes a wound portion; and a magnetic core that is arranged inside of the wound portion and outside of the wound portion, wherein the magnetic core is formed by combining a plurality of core pieces, at least one core piece of the plurality of core pieces is a first core piece that includes a molded body of a composite material and a non-magnetic member, the molded body of the composite material containing a magnetic powder and a resin, the non-magnetic member is held by the molded body of the composite material such that the non-magnetic member and the molded body constitute a single piece, the non-magnetic member includes a base portion that is arranged along an outer peripheral surface of the molded body of the composite material and a protruding piece that protrudes from the base portion, and the protruding piece is inserted into a region of the molded body of the composite material that is arranged inside of the wound portion, such that the protruding piece intersects an axial direction of the first core piece.

2. The reactor according to claim 1, wherein there is a gate mark in an outer peripheral surface of the molded body of the composite material on a protruding end side of the protruding piece.

3. The reactor according to claim 1, wherein the protruding piece protrudes from the base portion by a length that is greater than ½ of a length of the first core piece along a direction orthogonal to the axial direction, and the maximum length of the protruding piece along the axial direction is shorter than 2 mm.

4. The reactor according to claim 1, wherein a protruding direction of the protruding piece is a direction that extends along a long side of an imaginary rectangle that is the minimum rectangle in which an external shape of a cross section of the molded body of the composite material is included, the cross section being taken by cutting the molded body of the composite material along a plane that is orthogonal to the axial direction of the first core piece.

5. The reactor according to claim 1, wherein the coil includes two said wound portions that are adjacent to each other, the magnetic core includes a plurality of the first core pieces that include the protruding pieces that are respectively arranged inside of the two wound portions, and the first core pieces are arranged such that the base portions face each other and the protruding pieces are apart from each other.

6. The reactor according to claim 1, wherein a relative permeability of the molded body of the composite material is at least 5 and no greater than 50, and a relative permeability of a second core piece that is arranged outside of the wound portion is at least two times the relative permeability of the molded body of the composite material.

7. The reactor according to claim 6, wherein the relative permeability of the second core piece is at least 50 and no greater than 500.

8. The reactor according to claim 1, further comprising:

a resin molded portion that covers at least a portion of the magnetic core.

9. The reactor according to claim 2, wherein the protruding piece protrudes from the base portion by a length that is greater than ½ of a length of the first core piece along a direction orthogonal to the axial direction, and the maximum length of the protruding piece along the axial direction is shorter than 2 mm.

10. The reactor according to claim 2, wherein a protruding direction of the protruding piece is a direction that extends along a long side of an imaginary rectangle that is the minimum rectangle in which an external shape of a cross section of the molded body of the composite material is included, the cross section being taken by cutting the molded body of the composite material along a plane that is orthogonal to the axial direction of the first core piece.

11. The reactor according to claim 3, wherein a protruding direction of the protruding piece is a direction that extends along a long side of an imaginary rectangle that is the minimum rectangle in which an external shape of a cross section of the molded body of the composite material is included, the cross section being taken by cutting the molded body of the composite material along a plane that is orthogonal to the axial direction of the first core piece.

12. The reactor according to claim 2, wherein the coil includes two said wound portions that are adjacent to each other, the magnetic core includes a plurality of the first core pieces that include the protruding pieces that are respectively arranged inside of the two wound portions, and the first core pieces are arranged such that the base portions face each other and the protruding pieces are apart from each other.

13. The reactor according to claim 3, wherein the coil includes two said wound portions that are adjacent to each other, the magnetic core includes a plurality of the first core pieces that include the protruding pieces that are respectively arranged inside of the two wound portions, and the first core pieces are arranged such that the base portions face each other and the protruding pieces are apart from each other.

14. The reactor according to claim 4, wherein the coil includes two said wound portions that are adjacent to each other, the magnetic core includes a plurality of the first core pieces that include the protruding pieces that are respectively arranged inside of the two wound portions, and the first core pieces are arranged such that the base portions face each other and the protruding pieces are apart from each other.

15. The reactor according to claim 2, wherein a relative permeability of the molded body of the composite material is at least 5 and no greater than 50, and a relative permeability of a second core piece that is arranged outside of the wound portion is at least two times the relative permeability of the molded body of the composite material.

16. The reactor according to claim 3, wherein a relative permeability of the molded body of the composite material is at least 5 and no greater than 50, and a relative permeability of a second core piece that is arranged outside of the wound portion is at least two times the relative permeability of the molded body of the composite material.

17. The reactor according to claim 4, wherein a relative permeability of the molded body of the composite material is at least 5 and no greater than 50, and a relative permeability of a second core piece that is arranged outside of the wound portion is at least two times the relative permeability of the molded body of the composite material.

18. The reactor according to claim 5, wherein a relative permeability of the molded body of the composite material is at least 5 and no greater than 50, and a relative permeability of a second core piece that is arranged outside of the wound portion is at least two times the relative permeability of the molded body of the composite material.

* * * * *